United States Patent [19]

Deluegue

[11] 3,908,094

[45] Sept. 23, 1975

[54] TELEPHONE TRANSCEIVER WITH AMPLIFIED MICROPHONE AND SPEAKER

[75] Inventor: Andre Deluegue, Issy-les-Moulineaux, France

[73] Assignee: Central Telephone S.A., Ossu, France

[22] Filed: Jan. 14, 1974

[21] Appl. No.: 433,119

Related U.S. Application Data

[63] Continuation-in-part of Ser. No. 233,063, March 9, 1972, abandoned.

[30] Foreign Application Priority Data

Dec. 15, 1971 France .............................. 71.45024

[52] U.S. Cl. .............. 179/81 B; 179/81 A; 179/1 A

[51] Int. Cl.² ............................................ H04M 1/60

[58] Field of Search ........... 179/81 B, 1 HF, 100 L, 179/81 R, 1 F, 1 FS, 81 A, 1 A

[56] References Cited

UNITED STATES PATENTS

| | | | |
|---|---|---|---|
| 2,531,883 | 11/1950 | Kaelin | 179/81 B |
| 2,885,478 | 5/1959 | Cerofolini | 179/1 HF |
| 3,068,325 | 12/1962 | Streit | 179/81 B |
| 3,330,912 | 7/1967 | Koseki | 179/81 B |

FOREIGN PATENTS OR APPLICATIONS

| | | |
|---|---|---|
| 462,895 | 4/1968 | Switzerland |

*Primary Examiner*—Kathleen M. Claffy
*Assistant Examiner*—Joseph Popek

[57] ABSTRACT

An amplified loudspeaker and microphone are connected to a telephone transmission network by a coupling network including a telephone induction coil having a center-tapped primary winding. The output of a superimposed modulation amplifier associated with the microphone is applied to the center-tap of the induction coil primary winding and the input of a differential amplifier associated with the loudspeaker is connected across the coil secondary winding.

15 Claims, 4 Drawing Figures

TELEPHONE TRANSCEIVER WITH AMPLIFIED MICROPHONE AND SPEAKER

CROSS-REFERENCE TO RELATED APPLICATIONS

This application is a continuation-in-part of U.S. application Ser. No. 233,063 filed Mar. 9, 1972, now abandoned.

BACKGROUND OF THE INVENTION

1. Field of the Invention

The present invention relates to facilitating telephone communication. More specifically, this invention is directed to amplified telephone transceivers. Accordingly, the general objects of the invention are to provide novel and improved methods and apparatus of such character.

2. Description of the Prior Art

For many years attempts have been made to use amplified microphones and receivers in telephone installations. Prior attempts to amplify messages received and transmitted via telephone have, however, met with very limited success. The principal factor causing the previously limited success is the physical configuration of the telephone instrument. The receiver and microphone of a single telephone set are, for all practical purposes, mounted in a closed circuit and thus are susceptible to oscillation due to feedback between the receiver speaker and microphone. Such feedback, of course, renders the device useless.

In order to overcome the above briefly discussed feedback problem, use has been made of electronic switching devices which control the enabling of the receiver and microphone of a telephone set whereby they are selectively and individually connected to the circuit. Such electronic switching devices are relatively complex, expensive and invariably require an outside source of power. Additionally, such switching devices typically operate in response to the sound level in front of the amplified microphone and, accordingly, installation in an environment where a great deal of background noise is present is impossible since the background noise will result in the switching circuit disabling the receiver thereby preventing the reception of messages.

In the interest of providing amplification of messages to be received and transmitted by telephone it has also been suggested that switching or trigger circuits be employed to damp the amplified receiver and microphone outputs without placing either device completely out of the circuit. However, in the case of such damped systems it has been found necessary to separate the microphone and speaker by a substantial distance, typically on the order of 5–10 meters, and this is obviously not a practical approach doe to installation difficulties and limited mobility.

As a result of the above discussed problems most present day amplified telephone sets comprise a selector which enables the direction of communication to be determined manually. In such cases the selector switch must, of course, be frequently operated by the user during the course of a conversation.

SUMMARY OF THE INVENTION

The present invention overcomes the above briefly discussed and other deficiencies and disadvantages of the prior art by providing a novel and improved transmitter-receiver for a telephone transmission network, particularly of the type operating with carrier current, which includes an amplified loudspeaker and microphone. The apparatus in accordance with the present invention is of uncomplicated construction and operates automatically.

The present invention employs a novel coupling circuit for connecting an amplified loudspeaker and an amplified microphone to a telephone transmission network. This coupling circuit, in its most basic form, comprises an isolation transformer including a center-tapped primary winding and a secondary winding; a standard telephone induction coil with a bifilar primary winding functioning is the isolation transformer in the preferred embodiment. The loudspeaker or receiver circuit includes a differential amplifier connected across the isolation transformer secondary winding. The transmitter or microphone circuit includes an amplifier which supplies periodic modulation signals of one polarity; i.e., a superimposed modulation amplifier; and a balancing circuit. The balancing circuit is connected to the center-tap of the transformer primary winding and is adjusted in such a manner that there will be no signal induced in the secondary winding by the output of the transmitter circuit amplifier.

It is to be observed that center-tapped isolation transformers have long been employed in telephone sets to separate the receivers and microphones of conventional hand sets from one another. In accordance with the present invention the use of such a center-tapped isolation transformer in conjunction with a balancing circuit and a periodic modulation amplifier makes it possible to obtain amplification of received and transmitted messages without feedback and thus without oscillation between the transmitter-microphone and receiver-loudspeaker. In accordance with the invention the foregoing desirable objective results in part from the primary winding of the transformer in one telephone transceiver cooperating, on the Wheatstone bridge principle, with the corresponding transformer of the other transceiver participating in the communication.

The power consumption of the microphone and receiver amplifiers of the present invention is exceptionally low and the amplifiers may thus derive the power necesary for operation directly from a carrier current telephone network. In a preferred embodiment of the invention power for the loudspeaker amplifier is derived directly from the telephone network via a circuit comprising a suitable filter, for example a pair of limiting chokes, and a rectifier. Power for the microphone amplifier is derived from a rectifier connected across one winding of the center-tapped isolation transformer primary winding.

As a consequence of the satisfactory isolation between the microphone and loudspeaker, the present invention enables an entire set including amplifiers to be accommodated in a single housing of moderate size. Additionally, since the invention may be employed with telephone transceivers designed for use in BC or BCA type carrier current networks recognized by the Organization Internationale de Telecommunications of Geneva, the invention may take the form of a handset equipped with a receiver and microphone and connected to the telephone network via an induction coil and an adaptation circuit including a selector and hook-type switch.

BRIEF DESCRIPTION OF THE DRAWING

The present invention may be better understood and its numerous objects and advantages will become aparent to those skilled in the art by reference to the accompanying drawing wherein like reference numerals refer to like elements in the several figures and in which.

DESCRIPTION OF THE PREFERRED EMBODIMENTS

Figure 1:
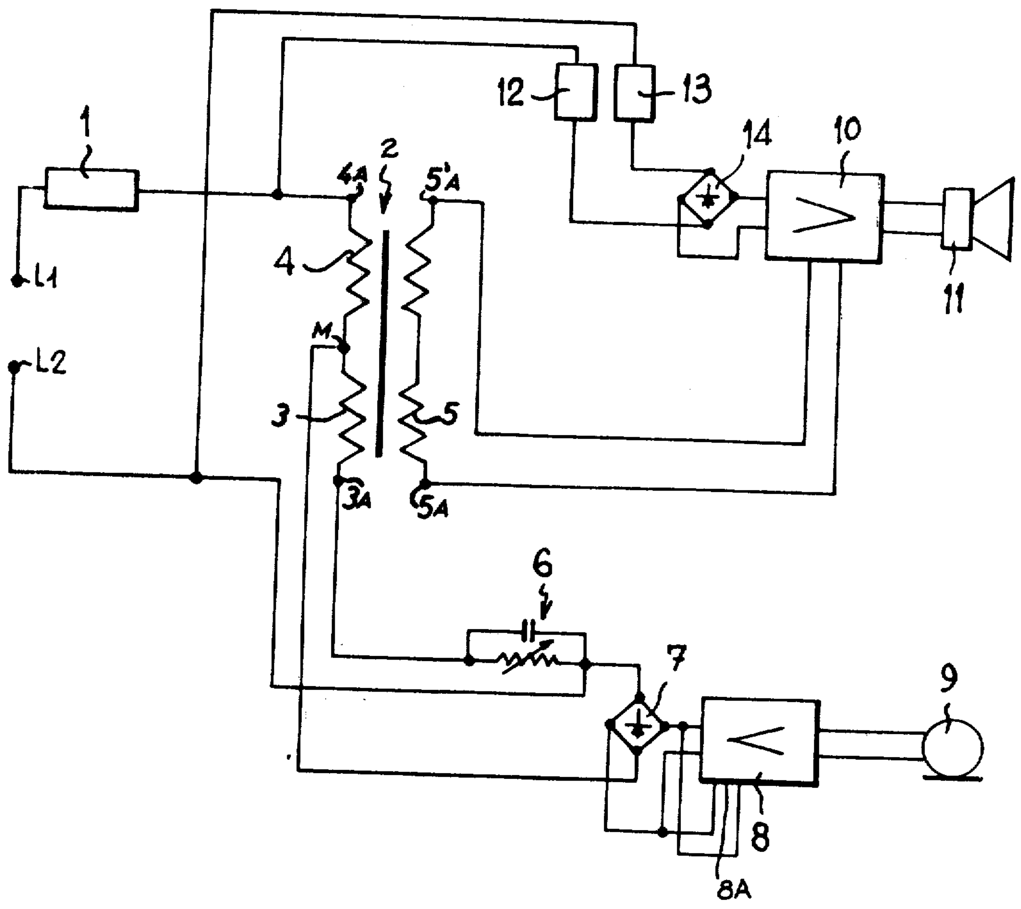
FIG. 1 is an electrical schematic representation of a first embodiment of the invention designed particularly for use in private telephone installations.

With reference to FIG. 1, a telephone set in accordance with the invention and intended for application to secondary networks or private installations is shown. The apparatus of FIG. 1 comprises a standard telephone induction coil, which is indicated generally at 2 and functions as an isolation transformer, and appropriate circuitry. Transformer 2 is connected, in the manner to be described below, to an amplified dynamic microphone 9 and an amplified loudspeaker 11. A first end terminal 4A of the center-tapped bifilar primary winding of transformer 2 is connected, via an adaptation circuit 1, to terminal L1 of the telephone line. The opposite end 3A of the primary winding of transformer 2 is connected to terminal L2 of the telephone line via a balancing circuit indicated generally at 6. As noted, the primary winding of transformer 2 has a center-tap M and a pair of opposed windings 3 and 4. In the FIG. 1 embodiment transformer 2 has a single secondary winding 5 having oppositely disposed end terminals 5A and 5'A.

The microphone 9, which as well known is effectively a variable resistance, is connected to the input of an amplifier 8. As will be described in additional detail below in the discussion of FIG. 4, amplifier 8 is of the type which produces periodic modulation signals; i.e., amplifier 8 is a superimposed modulation amplifier which provides a modulated direct current which flows continuously and which always remains of either positive or negative potential. A superimposed modulation amplifier is employed because it affords isolation between the microphone 9 and the loudspeaker 11 at the transformer 2 thus eliminating the necessity of using the complex switching circuits and variable attenuators which have characterized prior art amplified telephone transceivers. Isolation is achieved, with the aid of the superimposed modulation transformer, while employing a conventional bifilar telephone transformer. Additionally, because of the low current drain of the superimposed modulation amplifier, the present invention does not require an auxiliary power source. The output terminals 8A of amplifier 8 are connected to the opposite sides of a rectifier bridge 7. A first terminal of rectifier 7 is directly connected to telephone line terminal L2 and, via the balancing circuit 6, to end terminal 3A of primary winding 3 of transformer 2. A second oppositely disposed terminal of rectifier 7 is directly connected to the center-tap M of the isolation transformer primary winding. The rectifier bridge 7 furnishes, from the telephone line, the requisite power for operating amplifier 8.

Figure 2:
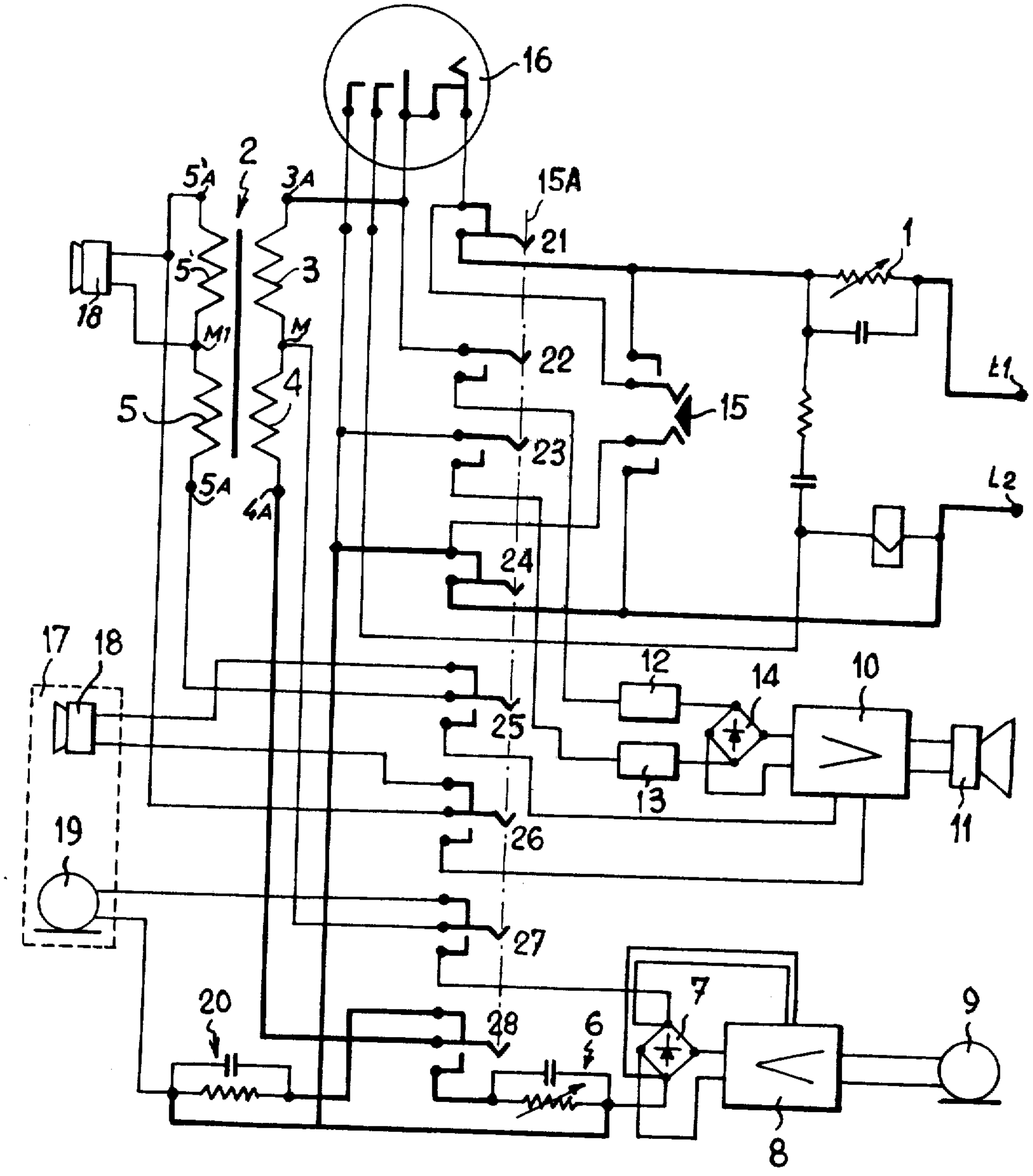
FIG. 2 is an electrical schematic showing of a second embodiment of the invention designed particularly for use in BC or BCA public telephone systems.
Figure 4:
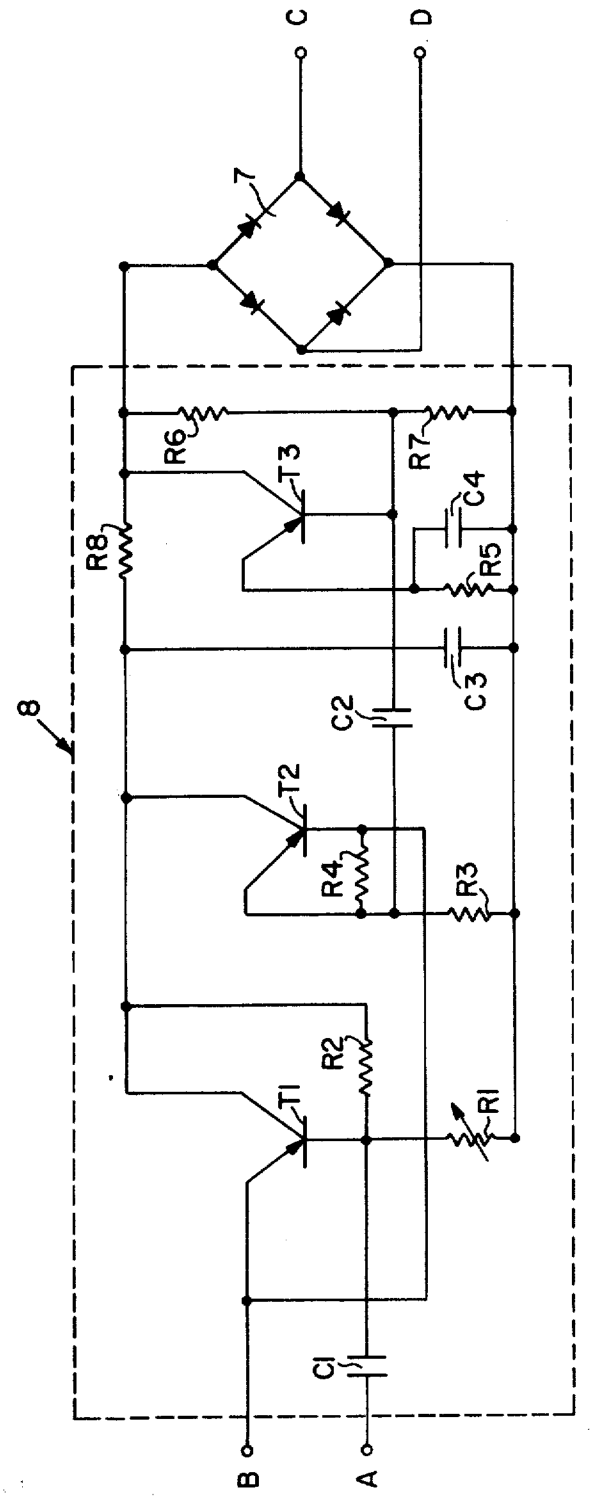
FIG. 4 is an electrical schematic showing of a periodic modulation amplifier which may be employed as the transmitter amplifier in the embodiments of FIGS. 1 and 2.

Referring now to FIG. 4, a periodic modulation amplifier suitable for use as the transmitter-microphone amplifier in the embodiments of FIGS. 1 and 2 is shown. Amplifier 8 is comprised of solid state components. Functionally, amplifier 8 may be considered to be a microphone amplifier for superimposed modulation. Amplifier 8 is, however, characterized by considerably smaller power drain than previous known amplifiers of similar type. The amplifier 8 must, of course, provide at its output terminals signals identical to those generated by a carbon microphone which is conventionally used in telephone transceivers. The microphone will function as a variable resistance thus modulating an applied current. Since amplifier 8 is characterized by low power requirements it may be driven, through the rectifier bridge 7, by the current supplied from the telephone system and modulated by microphone 9.

Considering amplifier 8 in more detail, the microphone 9 will be connected across the amplifier input terminals A and B. The amplifier is comprised of three stages comprising respectively transistors T1, T2 and T3. In the disclosed embodiment all three transistors are of the PNP type. Transistors T1 and T2, and their associated biasing resistors, define a two stage amplifier for the modulated input signals from the microphone. Transistor T3 functions as a modulator and specifically a superimposed periodic modulation stage. An alternating signal produced as the result of an acoustical input to microphone 9 is applied, via input coupling capacitor C1, between the base and emitter of transistor T1. The base of transistor T1 is connected, via a thermistor R1, to the positive terminal of the rectifier 7. Thermistor R1, in the manner shown in the art, provides for temperature compensation which thus results in stable operation regardless of the operating temperature of the amplifier. A biasing resistor R2 is connected between the base and collector of transistor T1 and the collector is connected, via a decoupling resistor R8, to the negative terminal of rectifier 7.

The amplified signal provided by the first amplifier stage comprising transistor T1; i.e., the signal appearing between the emitter and collector of transistor T1; is applied between the base and collector of transistor T2. The collector of transistor T2 is connected directly to the collector of transistor T1 and thus is also connected to the negative polarity terminal of the current source via resistor R8. The emitter of transistor T2 is connected to the positive terminal of the current source defined by rectifier 7 via resistor R3 and is also connected to the base of T2 via resistor R4. Transistor T2 amplifies any alternating signals appearing at the output of transistor T1 and provides an output signal which may be sensed across resistor R3.

Alternating output signals from the second stage transistor amplifier T2 are coupled, via capacitor C2, to the base of modulator transistor T3. Transistor T3 is, in effect, connected directly across the rectifier bridge 7; an RC circuit comprising resistor R5 and capacitor C4 being connected in the emitter circuit of T3. The base of transistor T3 is conveniently polarized on connection to a voltage divider network comprising resistors R6 and R7. The superimposed modulation amplifier circuit also comprises a capacitor C3 connected between the positive terminal of current source-rectifier 7 and the junction between the collectors of transistors T1 and T2 and resistor R8; capacitor C3 insuring isolation between the modulated output of modulator stage T3 and the direct current supply to amplifiers T1 and T2.

In operation, direct current is continuously furnished by rectifier 7 for the purposes of powering amplifier 8; the current being supplied by the telephone system. Current is delivered to the microphone 9 via transistor T1. Transistor T3 is continuously conducting and, as a result of the RC network comprising resistor R5 and capacitor C4 in the emitter circuit of T3, a suitable d.c. voltage level for the operation of transistors T1 and T2 will be established and filtered by the RC circuit comprising R8 and C3. Any periodic signals produced by microphone 9 will be amplified by transistors T1 and T2 and applied to the base of transistor T3. Alternating signals delivered to the base of transistors T3 produce a modulation in the magnitude of the current continously flowing in one direction between the collector and emitter of T3. Any modulation of the current delivered to T3 will, of course, be reflected to the "input" terminals C and D of rectifier 7. Terminals C and D of rectifier 7 are respectively connected to center-tap M of transformer 2 and terminal L2 of the telephone network.

To summarize, the transmitter stage consists of at least one amplifier which receives the output signal of a microphone, preferably a dynamic microphone, which is furnished with current from the telephone network via a rectifier. The output signal of the amplifier is applied to the base of a modulator transistor connected between a pair of rectifier terminals. Current will flow continuously in the collector-emitter circuit of the modulator transistor. Accordingly, output signals of the amplifier applied to the base of the modulator transistor produce variations in the collector-emitter current and thus modulate the direct current supply which is effectively the telephone line. The coupling of the signal from the microphone to the telephone line is accomplished with isolation of the collector-emitter current of the modulator transistor from the current supplied for the purposes of powering the amplification stage or stages.

Returning to a consideration of FIG. 1, loudspeaker 11 is driven by an amplifier 10. Amplifier 10 can be any type of linear amplifier; a differential amplifier being preferred from an economic viewpoint because it consumes current only with an information bearing signal at its input terminals. The input terminals of amplifier 10 are connected to the oppositely disposed end terminals 5A and 5'A of secondary winding 5 of transformer 2. Power for amplifier 10 is derived directly from the telephone line via a filter comprising a pair of choke coils 12 and 13 and a bridge type rectifier 14.

Feedback oscillation between the microphone 9 and speaker 11 will not be established in the present invention because of the combined action of balancing circuit 6 and periodic modulation amplifier 8. Proper adjustment of balancing circuit 6 and the connection of an output terminal of amplifier 8 to the center-tap M of the isolation transformer primary winding prevents the appearance of an alternating current at the center-tap M and thus no voltage will be induced in the secondary winding 5 of transformer 2 as a result of signals generated by microphone 9. Restated, the magnetic fields produced in primary windings 3 and 4 cancel each other with the circuit balanced and a signal initiated at microphone 9 will not result in a voltage being induced in secondary winding 5. Accordingly, complete separation between microphone 9 and speaker 11 is obtained. Alternating signals, in the form of messages, applied to terminals L1 and L2 of the telephone network will result in a voltage being induced in secondary winding 5 of the isolation transformer; such signals being amplified by amplifier 10 and being applied to speaker 11. Thus, in the receiver stage, incoming signals from a remote telephone transmitter are passed solely to the circuit for speaker 11 while, in the transmitter stage, no oscillation will be established between the speaker and microphone.

As implicit from the foregoing discussion, the flow of alternating current derived from amplifier 8 through the primary windings 3 and 4 of transformer 2 will not induce a signal in the secondary winding 5 of the transformer. At the telephone exchange these periodic message bearing signals; i.e., the signals applied to terminals L1 and L2; are polarized so that an alternating current appears across the primary winding of the isolation transformer in the other participating telephone. This a.c. message signal, when applied to the primary winding, will cause an alternating voltage to be induced in the secondary winding of the isolation transformer. Thus, in an installation of the type described, the primary windings of the transformers of the two telephones in communication define a Wheatstone bridge so that, at the receiving set, no real signal is obtained at the center-tap M of the primary winding. To insure a pleasant acoustic effect and the suitable operation of the microphone the circuits are adjusted whereby the current obtained at the center-tap M is very close to zero.

In an amplified telephone set of the type described above it is not necessary to install the microphone and speaker a substantial distance from one another. Accordingly, devices in accordance with the present invention can be accommodated in a single housing. Also, apparatus in accordance with the invention does not require external power sources since the amplifiers are fed directly from the carrier current telephone network.

Referring now to FIG. 2, a schematic diagram of a telephone receiver of conventional type is presented. In accordance with the present invention, however, FIG. 2 also depicts an amplified loudspeaker and microphone and it is to be noted that the embodiment of FIG. 2 is particularly intended for use in BC and BCA type public telephone networks. As depicted in FIG. 2, a conventional telephone handset 17 is connected, via the contacts of a switch type hook 15A to the primary winding of isolation transformer 2. The appropriate terminals of the primary winding of transformer 2 are in turn connected, via additional contacts of switch 15A and an adaptation circuit 1, to the terminals L1 and L2 of the telephone network. The telephone set of FIG. 2 further comprises a selector 16 and a secondary earphone 18A. By way of distinction from the embodiment of FIG. 1 it is to be noted that the secondary winding 5 of the FIG. 2 embodiment is also provided with a center-tap M1. The switch device 15A actually comprises eight switches 21–28 which have been shown in the position they will assume with handset 17 unhooked; i.e., removed from the cradle; and thus connected to the appropriate windings of transformer 2. Under these conditions the microphone 19 of handset 17 is connected via the contacts of switch 27 to the center-tap M of the primary winding of transformer 2 and, via a balancing circuit 20 and switch 28, to terminal 4A of the transformer primary winding. The receiver 18 of handset 17 is connected via the contacts of switch 26 to the terminal 5'A of the transformer secondary winding and via the contacts of switch 25 to terminal 5A of the transformer secondary winding. The secondary earphone 18A is connected across one-half of the secondary winding of transformer 2 as shown. The line terminal L1 is connected via adaptation circuit 1 and the contacts of switch 21 to the selector switch 16 and, via the contacts of switch 16, to terminal 3A of the transformer primary winding. Line terminal L2 is connected via the contacts of switch 24 to selector switch 16 and also, via balancing circuit 20, to microphone 19 of handset 17 and terminal 4A of the transformer primary winding. The connections as described are conventional in the prior art.

In accordance with the invention the amplified loudspeaker 11 and microphone 9 are connected in parallel with the corresponding elements of the handset 17. To achieve this connection the switches 25, 26, 27 and 28 of switching device 15A are each provided with a second fixed contact. This enables the input terminals of differential amplifier 10 to be connected to the terminals 5A and 5'A of the secondary winding of transformer 2. The additional fixed contacts on the switches also permit the output terminals of amplifier 8 to be connected, via rectifier bridge 7, to the center-tap M of the transformer primary winding and, via balancing circuit 6, to the end terminal 4A of the transformer primary winding. When the handset 17 is replaced on the cradle; i.e., the hook of switch 15A; the amplified circuits will be connected to the transformer 2 of the conventional circuit as described above.

The amplifier 10 of the loudspeaker 11, as in the case of the FIG. 1 embodiment, derives its power directly from the telephone network. For this purpose the switch device 15A comprises additional switches 23 and 24 which, when the handset is on the hook, connect the chokes 12 and 13 to the output of the selector device 16 and thence to terminals L1 and L2 of the network. To connect the selector 16 to terminal L1 and L2 when the handset is on the hook, and the switches 21 and 24 are open, the FIG. 2 embodiment additionally comprises a push button 15 having two pair of contacts mounted in parallel with switches 21 and 24.

In order to receive a communication or make a call on the amplified transceiver of FIG. 2 the user merely has to actuate the push button 15. When the transmission is weak or of unsatisfactory quality, however, the handset 17 may be unhooked and used. Removal of the handset from the "hook" automatically disconnects the amplified circuits.

Figure 3:
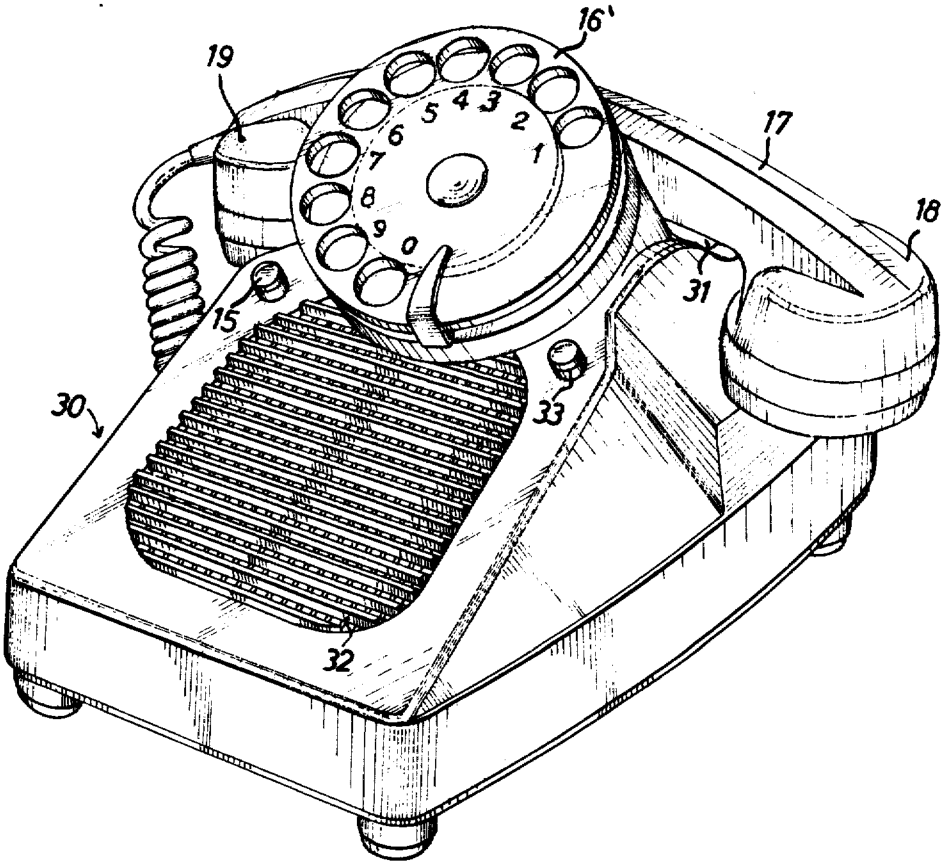
FIG. 3 is a perspective view of a telephone set including the embodiment of FIG. 2.

As may be seen from FIG. 3, the present invention, and particularly the circuitry of FIG. 2, may be accommodated in the housing of a telephone set. In FIG. 3 a conventional type telephone set is provided with a housing 30. The circuitry of FIG. 2 is mounted within housing 30. The upper part of housing 30 supports the disc 16' of the selector 16 and, behind the selector, housing 30 defines a depression 31 for accomodating the handset 17. Mounted in depression 31, and not shown in FIG. 3, are the mechanical devices for actuating the separate switches of switching device 15A. The loudspeaker 11 for the amplified circuit is mounted behind a grill work 32 as is the microphone 9. Housing 13 also supports the line connection button 15 and a further button type switch 33 which permits connection of the set to an internal network.

In one version of the invention the amplified telephone set may additionally comprise a pair of induction coils. One of these coils is intended for the connection of the handset and the other for connection of the amplified microphone and loudspeaker. Also, to insure reliable operation of the loudspeaker, the power supply circuit for its amplifier may comprise a current regulator of a known type.

From the foregoing it may be seen that the present invention consists of a telephone transceiver which comprises an amplified microphone and an amplified loudspeaker. The amplification circuit for the microphone comprises at least one periodic modulation amplifier and an associated balancing circuit while the amplification circuit for the speaker comprises a differential amplifier. In one embodiment of the invention the amplified microphone and speaker are connected in parallel with corresponding devices of a conventional handset and the existing isolation transformer of the conventional set is utilized.

While preferred embodiments have been shown and described various modifications and substitutions may be made thereto without departing from the spirit and scope of the invention. Accordingly, it is to be understood that the present invention has been described by way of illustration and not limitation.

What is claimed is:

1. In a telephone transceiver of the type employing an amplified loudspeaker and an amplified microphone within the same housing, the improvement comprising:

transformer means, said transformer means including a center-tapped primary winding and a secondary winding;

means for coupling the secondary winding of said transformer means to the loudspeaker, said coupling means including first amplifier means having a pair of input terminals connected to opposite ends of said transformer means secondary winding;

first connecting means connecting a first end of said transformer means primary winding to a first terminal of a two wire telephone network;

balancing circuit means for connecting the second end of said transformer means primary winding to the second terminal of a two wire telephone network;

second amplifier means having input terminals and a pair of output terminals, said second amplifier means input terminals being connected to the microphone, said second amplifier means including an output stage connected across said output terminals and having the operating characteristics of a variable resistance, said second amplifier means providing a modulated direct current output signal in response to a modulated input signal received from the microphone;

second connecting means for connecting a first of said second amplifier means output terminals to the second telephone network terminal; and third connecting means for connecting the other of said second amplifier means output terminals to the center-tap of said transformer means primary winding, said second amplifier means modulating the transformer means primary winding direct current to produce currents which are equal and in phase in both halves of said center-tapped primary winding, the magnetic fields generated by said in-phase currents being substantially mutually cancelling so that there will be no current induced in the transformer secondary winding.

2. The apparatus of claim 1 wherein said second amplifier means comprises:

a superimposed modulation amplifier having a pair of input terminals and a pair of output terminals, the microphone being connected across said superimposed modulation amplifier input terminals.

3. The apparatus of claim 2 wherein said second amplifier means further comprises:

first rectifier means, said first rectifier means having a first polarity output terminal connected to the second telephone network terminal by said first connecting means, said first rectifier means having a second polarity terminal connected to the center tap of said transformer means primary winding, said rectifier means first and second polarity terminals forming said second amplifier means output terminals, said first rectifier means deriving direct current power from the telephone line for operating said superimposed modulation amplifier;

means for delivering direct current power derived from the telephone line by said first rectifier means to said superimposed modulation amplifier; and means for connecting said superimposed modulation amplifier output terminals to opposite polarity terminals of said first rectifier means whereby said superimposed modulation amplifier will modulate direct current flowing through said transformer means primary winding.

4. The apparatus of claim 3 wherein said first amplifier means comprises:

a differential amplifier.

5. The aparatus of claim 3 further comprising:

second rectifier means connected to the telephone network, said second rectifier means providing direct current power for operating said first amplifier means; and means for delivering current from said second rectifier means to said first amplifier means.

6. The apparatus of claim 3 wherein said superimposed modulation amplifier comprises:

means for receiving and amplifying modulated signals received from the microphone;

continuously conductive modulator means, said modulator means being connected between a pair of oppositely polarized terminals of said first rectifier means and at least in part defining said second amplifier means output stage, said modulator means including a semiconductor which functions as a variable resistance; and means applying amplified microphone signals from said receiving and amplifying means to said modulator means whereby the current delivered to said modulator means from said first rectifier means will be modulated in accordance with the signals received from the microphone.

7. The apparatus of claim 6 wherein said modulation amplifier further comprises:

isolation circuit means connecting said amplifying means in parallel with said modulator means whereby the voltage for operation of said amplifying means will be developed across said modulator means and current for the microphone will be supplied via said first rectifier means.

8. The apparatus of claim 7 further comprising:

second rectifier means connected to the telephone network, said second rectifier means providing direct current power for operating said first amplifier means; and means for delivering current from said second rectifier means to said first amplifier means.

9. The apparatus of claim 1 wherein said second amplifier means comprises:

means for receiving and amplifying modulated signals provided by the microphone;

continuously conductive modulator means, said modulator means at least in part defining said second amplifier means output stage, said modulator means including a semiconductor device which functions as a variable resistance; and means applying amplified microphone signals from said receiving and amplifying means to said modulator means.

10. The apparatus of claim 9 wherein said first amplifier means comprises:

a differential amplifier.

11. In a telephone transceiver comprising a telephone handset including a microphone and a speaker, a subset supporting said handset, said subset also supporting a switch hook mechanism operated by said handset when resting on said subset, and an amplified loudspeaker and an amplified microphone, the improvement comprising:

transformer means, said transformer means including a center-tapped primary winding and a secondary winding inductively coupled to said primary winding;

means connecting the secondary winding of said transformer means to the loudspeaker, said connecting means including first amplifier means having a pair of input terminals connected to opposite ends of said transformer means secondary winding;

means connecting a first end of said transformer means primary winding to a first terminal of a two wire telephone network;

means including a balancing circuit for connecting the second end of said transformer means primary winding to the second terminal of the two wire telephone network;

superimposed modulation amplifier means having an input circuit, said modulation amplifier means also having a pair of output terminals and an output stage which has the operating characteristics of a variable resistance, said output stage being connected across said output terminals and providing a modulated direct current output signal in response to a modulated input signal;

means connecting the microphone to said modulation amplifier means input circuit whereby said modulating direct current output signal is commensurate with signals provided from the microphone; and means connecting said modulation amplifier means output terminals respectively to the second terminal of the telephone network and to the center-tap of said transformer means primary winding whereby said modulation amplifier means modulates the transformer means primary winding direct current to produce currents which are equal and in phase in both portions of said primary winding, the magnetic fields generated by said in-phase currents being substantially mutually cancelling so that there will be no current induced in the transformer secondary winding.

12. The apparatus of claim 11 wherein said superimposed modulation amplifier means further comprises:

first rectifier means, said first recitifier means having a first polarity output terminal connected to the second telephone network terminal by said first connecting means, said first rectifier means having a second polarity terminal connected to the center tap of said transformer means primary winding, said rectifier means first and second polarity terminals forming said superimposed modulation amplifier means output terminals, said first rectifier means deriving direct current power from the telephone line for operating said superimposed modulation amplifier;

means for delivering direct current power derived from the telephone line by said first rectifier means to said superimposed modulation amplifier; and means for connecting said superimposed modulation amplifier output terminals to opposite polarity terminals of said first rectifier means whereby said superimposed modulation amplifier will modulate direct current flowing through said transformer means primary winding.

13. The apparatus of claim 12 further comprising:

first switch means for selectively connecting the handset and amplified microphone and loudspeaker to the telephone network through said transformer means.

14. The apparatus of claim 13 wherein said first switch means comprises:

a plurality of single pole double throw switches operated simultaneously, the normally closed terminals of said switches connecting said handset microphone and receiver respectively to said transformer primary and secondary windings, the normally open terminals of said switches connecting the output terminal of said modulation amplifier means and the input terminal of said first amplifier means respectively to said transformer means primary and secondary windings; and second switch means for connecting said modulation amplifier means output terminals and first amplifier means input terminals in parallel with said handset microphone and speaker with said plurality of switches in the normally closed condition.

15. The apparatus of claim 14 further comprising:

a single housing having the microphone and loudspeaker and said amplifier and switch means mounted therein, said housing supporting the switch hook mechanism and the subset receiving the handset.

* * * * *